United States Patent
Altrichter et al.

(10) Patent No.: US 8,566,285 B2
(45) Date of Patent: Oct. 22, 2013

(54) METHOD AND SYSTEM FOR SCHEDULING AND CONTROLLING BACKUPS IN A COMPUTER SYSTEM

(75) Inventors: Ralf Altrichter, Filderstadt (DE); Oliver Augenstein, Weilim Schoenbuch (DE); Stefan Huetter, Weilim Schoenbuch (DE); Hans-Ulrich Oldengott, Jettingen (DE)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 12/466,757

(22) Filed: May 15, 2009

(65) Prior Publication Data

US 2009/0300633 A1    Dec. 3, 2009

(30) Foreign Application Priority Data

May 28, 2008  (EP) .................................... 08157048

(51) Int. Cl.
*G06F 17/30*    (2006.01)
(52) U.S. Cl.
USPC .............................. 707/654; 707/640; 718/103
(58) Field of Classification Search
USPC ..................... 707/640, 654; 718/103
See application file for complete search history.

(56) References Cited

U.S. PATENT DOCUMENTS

| | | | | |
|---|---|---|---|---|
| 5,778,165 | A * | 7/1998 | Saxon .......................... | 714/4.12 |
| 5,854,754 | A * | 12/1998 | Cabrera et al. .................... | 703/2 |
| 7,461,102 | B2 * | 12/2008 | Derk et al. ............................ | 1/1 |
| 2003/0099460 | A1 * | 5/2003 | Imada et al. .................... | 386/52 |
| 2004/0249865 | A1 * | 12/2004 | Lee et al. ...................... | 707/200 |
| 2006/0288049 | A1 * | 12/2006 | Benedetti et al. ............. | 707/200 |
| 2008/0307019 | A1 * | 12/2008 | Weiss et al. ................... | 707/204 |

OTHER PUBLICATIONS

Screenshot of Oracle Enterprise Manager, Copyright 2007, by Oracle.*
Article entitled "User's Guide for Oracle E-Business Suite Access Method" by IBM on Nov. 2003.*
"Data Sheet: Data Protection. Veritas NetBackup—Platform," 2007. Symantec Corporation, pp. 1-4, Jun. 2007.
"IBM Tivoli Workload Scheduler," IBM Corporation, pp. 1-8, Dec. 2008.
"IBM Tivoli Dynamic Workload Automation Portfolio," 2007. IBM Corporation, pp. 1-6, Mar. 2007.

* cited by examiner

*Primary Examiner* — Mahesh Dwivedi
(74) *Attorney, Agent, or Firm* — Lieberman & Brandsdorfer, LLC (57) ABSTRACT

A method, system, and article to manage a backup procedure of one or more backup tasks in a computing system. A backup window within which the backup tasks are to be executed is defined, and the backup tasks within the backup window are scheduled. The process of the backup procedure is controlled during execution. The process of controlling the backup procedure includes calculating the prospective duration of all actually running and all future backup tasks, and cancelling low priority backup tasks in case a higher priority backup task is projected to continue beyond an end time ($T_{end}$) of the backup window.

18 Claims, 7 Drawing Sheets

METHOD AND SYSTEM FOR SCHEDULING AND CONTROLLING BACKUPS IN A COMPUTER SYSTEM

BACKGROUND OF THE INVENTION

1. Technical Field

The invention relates to techniques for managing data backup in computing systems. More specifically, the invention provides a method for planning and controlling the execution of backup tasks in a computing system.

2. Description of the Prior Art

Data backup in computing systems are necessary in order to produce additional copies of the data that may be used to restore the original data in case of a data loss within the computing system. Many different techniques have been developed to optimize the backup procedure. As an example, U.S. Pat. No. 7,103,740 to Colgrove et al. describes a backup method for a multi-class file system, wherein more recently modified data are assigned and/or migrated to higher storage classes and less recently modified data may be migrated at time intervals to lower storage classes. Backup of each of the storage classes may be performed at time intervals. Irrespective of backup method used, crucial questions for system administrators dealing with backup planning/scheduling include: "When will my backup be finished?"—"Will it be finished early enough so that applications will not be constricted?"—"If resources are limited, how can I make sure that at least the most important backups (production backups) will be finished in time?"

In current scheduling systems, users specify a point in time or a time interval when a certain backup is to be started. This specification has to be carried out for every backup. As a rule, the user estimates the probable backup duration to ensure the requested end time is met. Traditional scheduling systems use forward calculation based on expected duration values for executing jobs. Such scheduling systems do not consider general time interval restrictions. Some state of the art backup management systems, such as Veritas, contain a scheduling system which is calendar driven. It calculates the latest start time based on the last backup run and takes the number of files of backup into account. However, current scheduling systems do not control concurrently running backups during backup execution with respect to their workload and execution progress. Improper scheduling of concurrently running backup procedures can result in delays to data backups and a failure of one or more of the backups to meet their expected target end time.

In view of the foregoing, there is a need for a backup management method with a scheduling process furnishing a reliable backup schedule with reduced the expert knowledge to be provided by the user. Moreover, there is a need of a backup management method which assures that in the case of restricted resources at least the most important backup tasks will be accomplished successfully within a predefined backup window.

SUMMARY OF THE INVENTION

It is an object of the invention to provide a method and a system for improved planning and controlling of backup procedures comprising one or multiple backup tasks in a computing system.

These objectives are achieved by the features of the independent claims. The other claims and the specification disclose advantageous embodiments of the invention.

According to one aspect of the invention, a method of managing a backup procedure in a computing system is provided, the backup procedure consisting of one or several backup tasks. The method includes defining a backup window within which the backup tasks are to be executed, scheduling the backup tasks within the backup window, and controlling the progress of the backup procedure during execution and selecting a backup task to be cancelled if the backup procedure is expected to continue beyond a predetermined point in time.

According to another aspect of the invention, a system for managing a backup procedure with one or several backup tasks in a computing system is provided. The system includes a backup definition system to define a backup window within which the backup tasks are to be executed, a backup scheduling system to schedule the backup tasks within the backup window, and a backup control system to control the progress of the backup procedure during execution and selection of a backup task to be cancelled if the backup procedure is expected to continue beyond a predetermined point in time.

According to a yet further aspect of the invention, an article having a computer-readable carrier including computer program instructions configured to manage a backup procedure comprising at least one backup tasks in a computing system is provided. The instructions when executing define a backup window within which the at least one backup task is to be executed. Instructions are also provided to schedule the backup task within a backup window and to control progress of the backup procedure during execution. To address when the backup procedure is expected to continue beyond a predetermined point in time, instructions are provided to cancel the backup task.

Other features and advantages of this invention will become apparent from the following detailed description of the presently described embodiments of the invention, taken in conjunction with the accompanying drawings.

BRIEF DESCRIPTION OF THE DRAWINGS

The present invention together with the above-mentioned and other objects and advantages may best be understood from the following detailed description of the embodiments, but not restricted to the embodiments, wherein is shown in.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF THE PREFERRED EMBODIMENT(S)

It will be readily understood that the components of the present invention, as generally described and illustrated in the Figures herein, may be arranged and designed in a wide variety of different configurations. Thus, the following detailed description of the embodiments of the method, system, and article, as presented in the figures, is not intended to limit the scope of the invention as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided in relation to scheduling data backup, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by references to the drawings, wherein like parts are designated by like numerals throughout. The following description is intended only by way of example, and simply illustrates certain select embodiments of devices, systems, and processes that are consistent with the invention as claimed herein.

Figure 1:
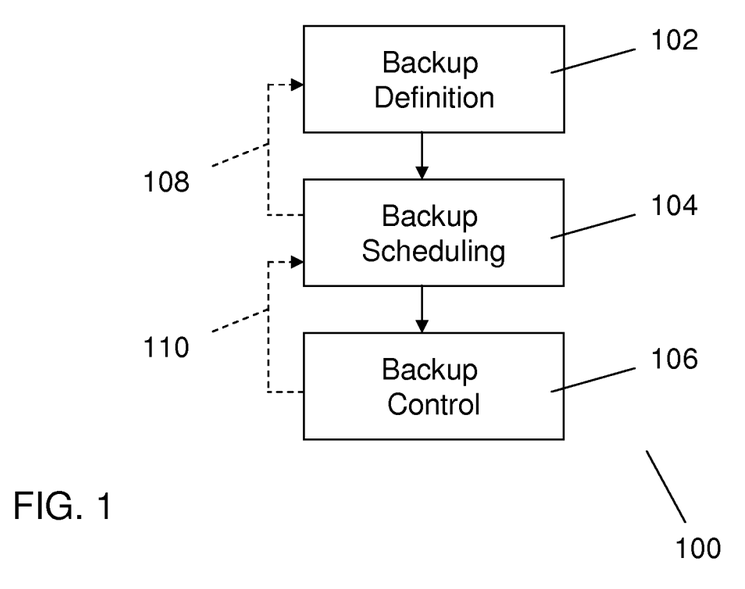
FIG. 1 is a schematic flow diagram of a method for managing a backup procedure in a computing system, comprising a backup definition step, a backup scheduling step and a backup control process.

FIG. 1 depicts a schematic flow diagram (100) of a method for managing a backup procedure (1) in a computing system. The method comprises a backup definition step (102), a backup scheduling step (104), as well as a backup control process (106). Backup definition and scheduling steps (102) and (104), are carried out before execution of the backup procedure. In one embodiment, backup definition and scheduling steps (102) and (104) can be combined into a single process step. Whereas, the backup control process (106) is executed concurrently with the execution of the backup procedure, e.g. periodically or at predetermined instances in time.

In the backup definition step (102), a time window in the form of a backup window (2), is defined during which the backup procedure (1) is to take place. Typically, backup window (2) will be interactively specified by the user, based on experience. In particular, backup window (2) will preferably be chosen such as to coincide with periods of low computer activity, e.g. at night time or on the weekend. Additionally or alternatively, suggestions for suitable start and end points $T_{start}$, $T_{end}$ of the backup window (2) can be determined from a workload analysis of the computing system. Thus, for example, historical workload demand data of the computing system, as obtained e.g. from measurement of queue length or transaction rate, can be analyzed for periodical occurrences of low workload demand. These periods of prospective reduction of workload demand can be used for backup processing. Typically, backup processing will be repeated periodically at predefined times, such as once per day or once per week. By defining the backup windows (2) as well as "restriction intervals" during which backup processing is not allowed, the user will restrict backup processing to given time intervals, thus guaranteeing that online applications can run without restriction.

Besides setting the backup window (2), during backup definition step (102) the user defines all individual backup tasks to be performed during the backup procedure (1), including the realm of backup, required computing and storage resources, etc. In one embodiment, the user additionally assigns each backup task to a priority class. Examples of priority classes include, but are not limited to:

Top priority class (Class-1) for backup tasks which are mission critical operations and have to be completed within backup window (2);

High priority class (Class-2) for backup tasks which are important and should be completed within backup window (2);

Low priority classes for backup tasks which are less important (Class-3) or unimportant (Class-4) and may be cancelled if backup time becomes scarce.

Having defined the backup window (2) as well as the backup tasks to be processed, a backup scheduling step (104) is performed in which a prospective duration for each backup task is determined. This prospective duration can be calculated or estimated in one of a variety of ways, e.g. by analyzing the duration of past backup tasks of the same or a similar system, by considering the changes made in the data since the last backup task, by simulation etc. In particular, historical information about past backup tasks can be used for estimating a latest possible start time for a given task within the backup window (2), by performing a backward calculation based on the predefined end time of the backup window (2).

Subsequently, all backup tasks are scheduled to fit into the backup window (2), taking into account their respective hardware and software requirements, potential dependencies between backup tasks and/or resources, prospective durations etc. Given the prospective duration of each backup task, a "task startup window" for this task is defined within which this backup task has to be started for the backup to terminate before the end of the backup window (2). Thus, a backward calculation is performed in order to determine the latest possible start time for each backup task. For a backup procedure involving multiple backup tasks, scheduling step (104) will typically involve an iterative process which terminates once all backup tasks are scheduled in such a way that they begin and terminate within backup window (2). If the scheduling step (102) is found not to yield any valid results, i.e. if the backup routines cannot be fit into the backup window (2), an error message (108) is issued, and user is referred back to the backup definition step (102), so that backup window (2) can be enlarged and/or some of the backup tasks can be deleted or downgraded.

Figure 2:
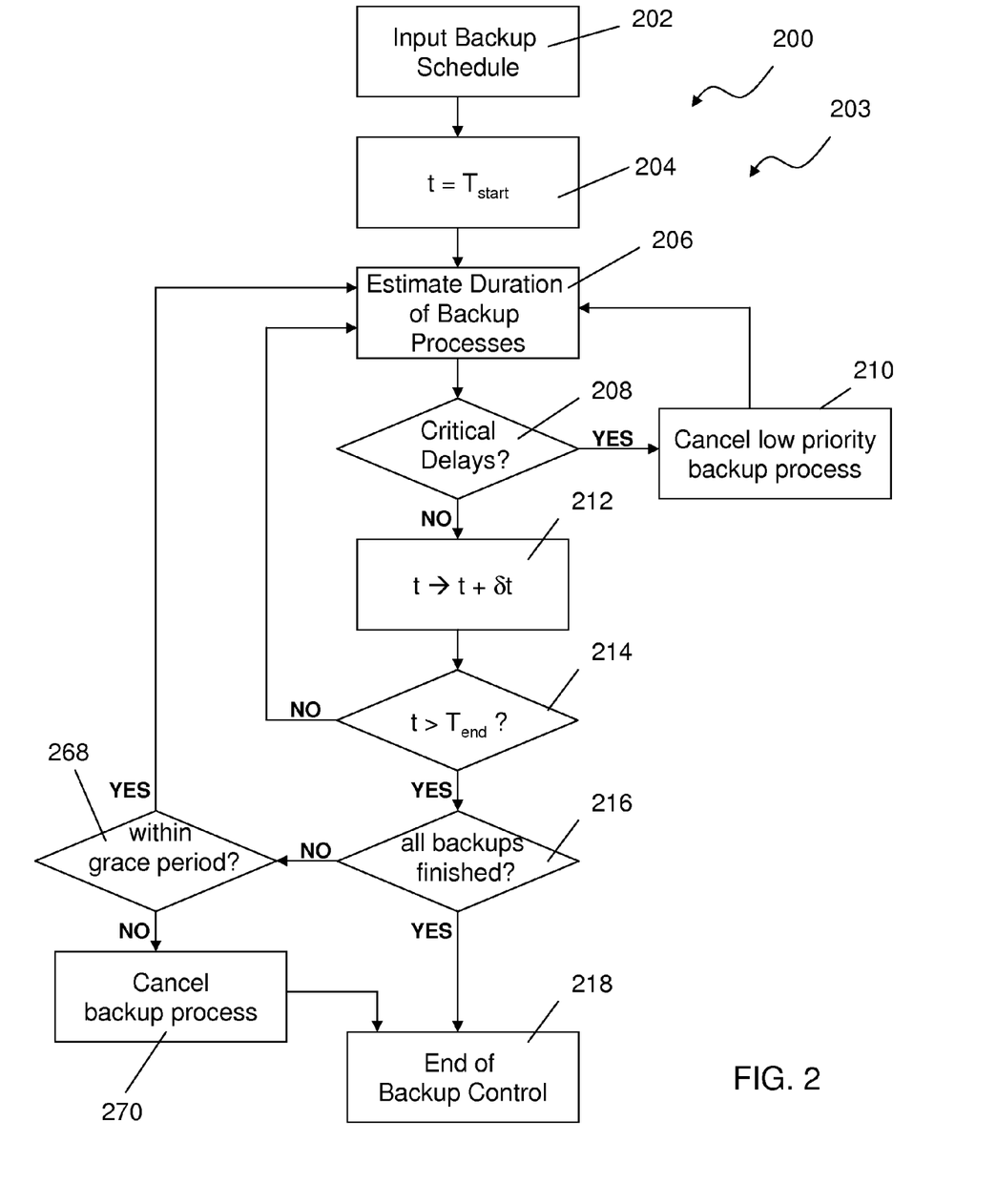
FIG. 2 is a detailed flow diagram of a backup control process of FIG. 1.
Figure 3A:
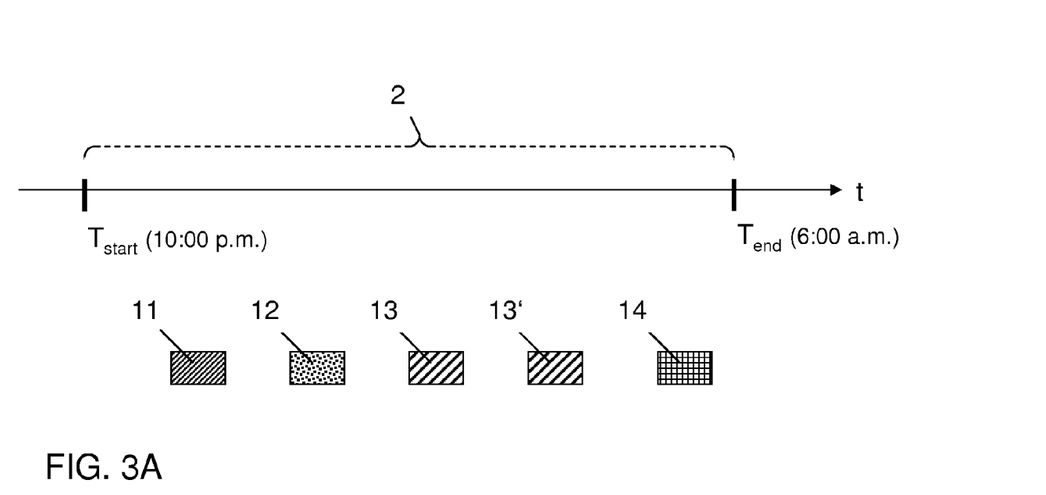
FIG. 3A is a schematic diagram depicting a backup window and a set of five backup tasks as defined in backup definition step of FIG. 1.
Figure 3B:
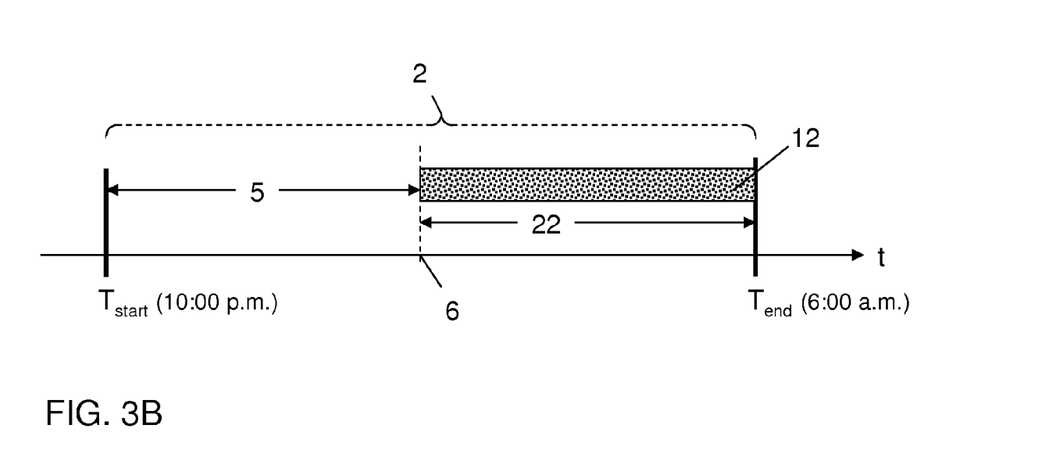
FIG. 3B is a schematic diagram depicting a "start window" of a task within the backup window of FIG. 3A, as evaluated in scheduling step of FIG. 1.
Figure 3C:
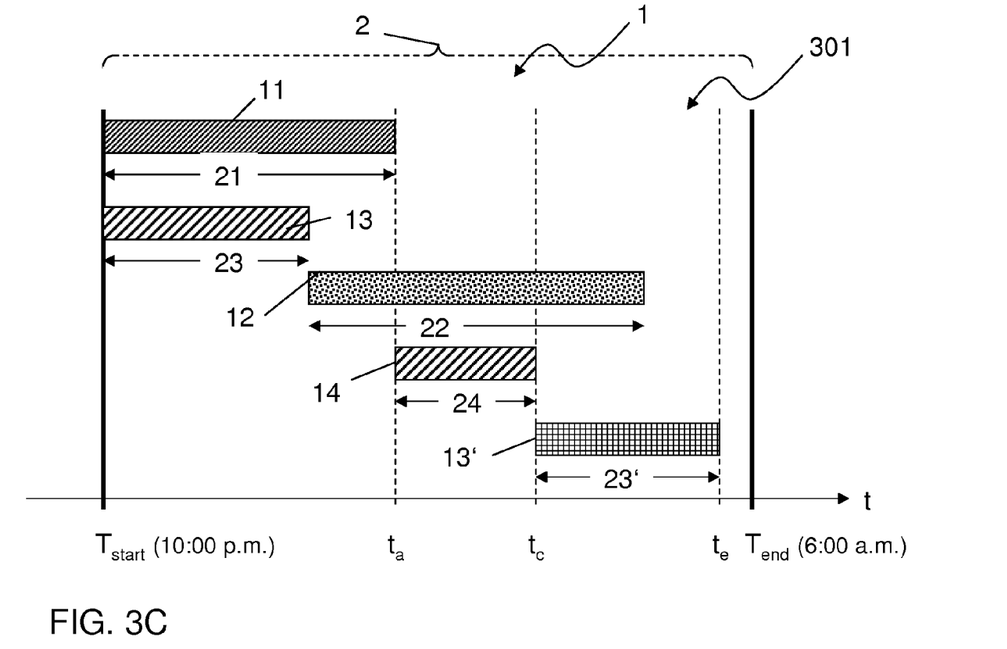
FIG. 3C is a schematic diagram depicting a backup schedule of the five backup tasks of FIG. 3A, as evaluated in scheduling step of FIG. 1.

If the scheduling step (104) is found to yield a valid backup schedule (301), as shown in FIG. 3C, backup procedure (1) will be automatically started once the starting point $T_{start}$ of the backup window (2) has been reached. During execution of the backup procedure (1), backup control process (106) will periodically monitor and evaluate the progress of the backup procedure (1). A detailed flow diagram of an embodiment of backup control process (106) is depicted in FIG. 2 and will be described in detail later on. Depending on the outcome of the backup procedure (1), backup control process (106) will issue status reports and/or error messages (110), enabling the user to reiterate backup scheduling step (104) and giving the user an opportunity to reevaluate backup duration estimates, change the sequences of individual backup tasks, allocate additional hardware resources etc. of the backup procedure.

Although not described in detail, the backup managing method of FIG. 1 may comprise various additional features as would be obvious to a person skilled in the art, such as data extraction/compression routines, resource allocation and backup verification steps etc.

FIG. 3A-3H illustrate one embodiment of the method of FIG. 1 by means of a specific example. FIG. 3A depicts the outcome of backup definition step (102), namely the backup window (2) for a backup procedure to be performed daily, with its start point $T_{start}$ (in this example, 10:00 p.m.) and end point $T_{end}$ (in this example, 6:00 a.m.), five backup tasks (11), (12), (13), (13'), and (14) to be performed during the backup procedure (1) as well as the priority classes of the backup tasks (11)-(14). Backup task (11) is mission critical and has to be completed within the given time frame; therefore, it has highest priority and has been assigned to the top level class (Class-1). Backup task (12) is important and should be completed within the given time frame. Therefore, task (12) has been assigned to the next highest class (Class-2). Backup tasks (13) and (13') are less important and have been assigned to a low priority class (Class-3). Backup task (14) is not important and may be cancelled if backup time becomes scarce. Therefore, task (14) has been assigned to the lowest level class (Class-4).

Given the backup window (2), the backup tasks (11)-(14) as well as their priority, prospective durations (21)-(24) of the backup tasks (11)-(14) are calculated in backup scheduling step (104). Subsequently, task startup windows are calculated for all backup task, as illustrated in FIG. 3B for the case backup task (12): backup task (12), having a prospective duration (22), must be started within startup window (5) after $T_{start}$—and before final startup time (6) at the very latest, in order to be expected to finish within the backup window (2) to which the backup procedure (1) has been assigned. Based on calculations of the prospective durations (21)-(24) of all backup tasks (11)-(14), their individual backup windows, their priorities, as well as additional resource information, e.g. concerning throughput rates, storage resources such as the number of available tapes etc., backup scheduling step (104) will attempt to compute a backup schedule (301) comprising all backup tasks (11)-(14).

An example of a backup schedule (301) resulting from this backup scheduling step (104) is shown in FIG. 3C. As can be seen, backup scheduling step (104) has managed to fit all five tasks (11)-(14) within backup window (2). According to the backup schedule (301) of FIG. 3C, backup procedure (1) is scheduled to begin at time $T_{start}$ by starting to execute backup tasks (11) and (13). Backup task (11) is expected to run for a duration (21) and terminate at time $t_a$, at which time backup task (14) is scheduled to begin, expected to run for a duration (24) and terminate at time $t_c$. The staggered scheduling of backup tasks (11) and (14) may be due to these two tasks (11), (14) requiring access to overlapping computing or backup resources, e.g. usage of identical data compression programs or identical storage media (tape, hard disk etc.). As a consequence, a delay in backup task (11) may result in a delay of other, subsequent backup tasks (14) and (13') using the same resources, e.g. storage media such as tapes. Note that these dependencies of backup tasks (11), (14), and (13') are stored as part of the backup schedule (301), so that if backup task (11) were delayed, beginning of backup tasks (14) and (13') would be postponed accordingly.

Figure 3D:
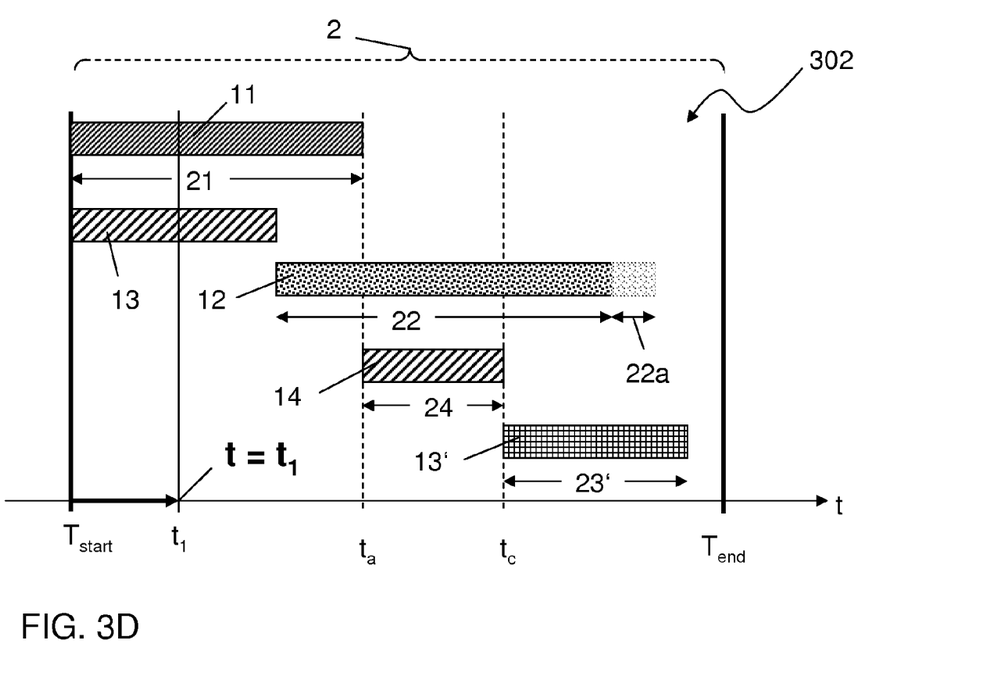
FIG. 3D is a diagram showing the prospective duration of the backup tasks of FIG. 3C at time $t_1 > T_{start}$ (i.e. after start of backup processing)

A backup schedule (301) as shown in FIG. 3C forms the basis of the backup procedure (1) which will begin at time $T_{start}$. While executing, the progress of the backup procedure (1) is repeatedly controlled and monitored by the backup controlling process (106). Especially, updated forecasts for the expected durations of the backup tasks (11)-(14) are repeatedly calculated during backup procedure (1), preferably periodically at predetermined time intervals δt, e.g. every five minutes. Depending on current data throughput, factual volume of the backup tasks, availability of resources etc., the backup schedule (301) originally calculated in backup scheduling step (104) is periodically actualized and modified to yield an updated backup schedule. As an example, FIG. 3D depicts a backup schedule (302) derived from the original backup schedule (301) of FIG. 3C and calculated at time $t_1 > T_{start}$ into the backup procedure (1). At this time $t_1$, backup controlling process (106) estimates backup tasks (11), (13), (13') and (14) to perform as originally predicted, see FIG. 3C. In contrast, backup task (12), maybe due to an amended estimate of its data volume, is now predicted to require a time interval extension (22a) longer than originally scheduled. This extension (22a), however, is found to be uncritical since backup task (12) is still predicted to terminate well before end point $T_{end}$ of backup window has been reached, and since resources blocked by backup task (12) are not required by any competing backup task. Thus, the update of the backup schedule (302) shown in FIG. 3D as calculated by backup controlling process (106) at time $t_1$, exhibits only minimal changes, i.e. uncritical increases in the expected duration of the backup tasks, so that at time t, the backup procedure (1) performs as anticipated and there is no need for any action.

Figure 3E:
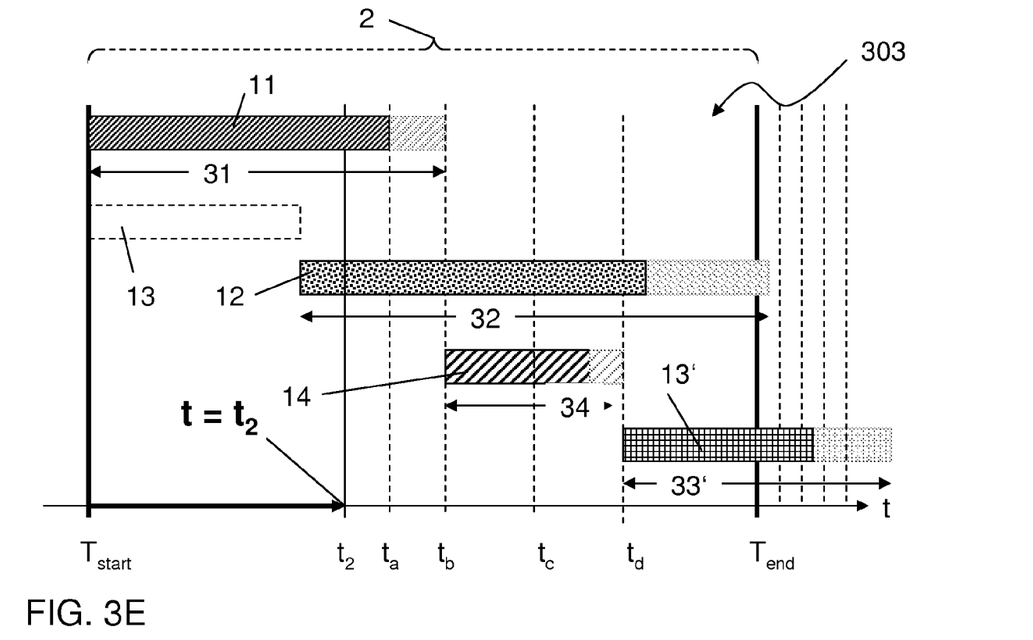
FIG. 3E is a diagram showing the prospective duration of the backup tasks of FIG. 3D at a later time $t_2 > t_1$.

On the other hand, due to circumstances not foreseen by backup scheduling (104), e.g. due to unexpected volume or complexity of backup tasks, resource bottlenecks etc., the backup procedure (1) may be found to exhibit significant deviations from the prediction. As an example, FIG. 3E depicts a backup schedule (303) derived from the backup schedule (302) of FIG. 3D, calculated at later time $t_2 > t_1$, well into the backup procedure (1). At this time $t_2$, backup task (13) has already finished. For all remaining backup tasks (11), (12), (13'), (14), backup controlling process (106) has determined prospective durations (31), (32), (33'), and (34) which considerably exceed the original durations (21), (22), (23') and (24) as estimated during backup scheduling (104), indicating that all remaining backup tasks will finish later than anticipated. For example, backup task (11) is now expected to end at time $t_b$, later than the originally estimated end time $t_a$. The situation is aggravated for backup task (14) which competes with back task (11) for storage resources and therefore cannot begin before end time $t_b$ of backup task (11) and is now expected to end at time td, later than the originally estimated end time $t_c$. The same holds true for backup task (13') with respect to backup task (14). As a consequence, execution of backup tasks (12) and (14) is now expected to last so long that their end points will lie outside the limit $T_{end}$ of the backup window (2).

In this situation, backup controlling process (106) needs to take steps to assure that at least the more important backup tasks, namely task (11) belonging to Class-1 and preferably also task (12) belonging to Class-2, will be finished in time. In order to assure this, according to one embodiment of the invention, the set of backup tasks not yet finished is searched for low priority backup tasks which compete with higher priority backup tasks for resources, e.g. access to storage devices such as tape drive. These low priority backup tasks will be cancelled in order to free resources, thus leading to a reduction of delays for competing and consecutive higher priority backup tasks.

Figure 3F:
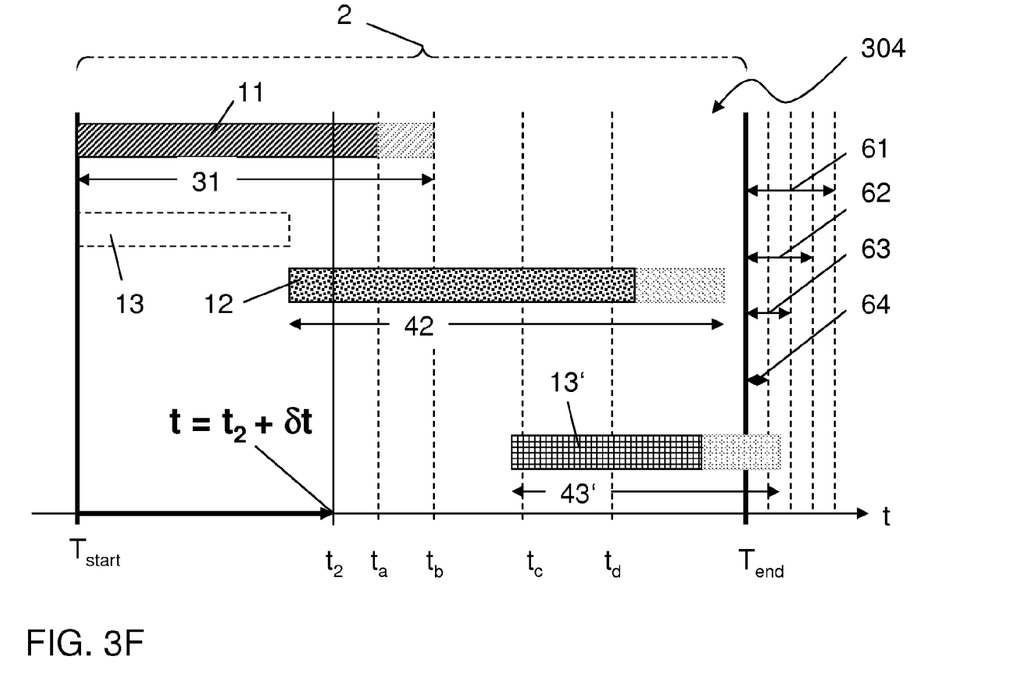
FIG. 3F is the diagram of FIG. 3E at a slightly later time $t_2 + \delta t$, after cancellation of low-class backup tasks.

In the example depicted in FIG. 3E, backup task (14) belonging to Class-4 has the lowest priority and will thus be the first to be cancelled. Deletion of backup task (14) has the effect that the expected delays of the remaining backup tasks (12) and (13') are reduced. FIG. 3F shows the corresponding updated backup schedule (304) at a slightly later time $t_2+\delta t$, in which backup task (14) has been cancelled, resulting in the remaining backup tasks (12) and (13') having reduced estimated durations (42), (43') as compared with their durations (32), (33'), respectively, at time $t_2$. Backup task (11) is independent of backup task (14) and thus will not be reduced in length. Note that since low priority backup tasks (14) are most likely to be cancelled, it is advantageous to tune backup scheduling step (104) in such a way that low priority backup tasks (14) will be started comparatively late in backup window (2), thus giving leeway to higher priority tasks (11) and (12) running longer than anticipated. High priority tasks (11) and (12) should be started relatively early in order to assure successful execution within the backup window (2).

Note that in the updated backup schedule (304), Class-2 backup task (12) is now expected to terminate within the backup window (2,) whereas Class-3 backup task (13') is still expected to exceed backup window (2) end point $T_{end}$. If backup procedure (1) comprised additional backup tasks with priority lower than Class-3, these could now be cancelled one by one in an effort to further reduce the expected duration (43') of backup task (13'). However, since no such lower class backup tasks are available, duration (43') cannot be further reduced, and backup task (13') is expected to terminate after backup window (2) end point $T_{end}$.

Under normal circumstances, backup task (13') will now be cancelled, since it is not expected to finish execution within the predefined backup window (2). However, in one embodiment of the invention, the user can define a "grace period" (63) during backup definition step (102), this "grace period" (63) to be added to backup window (2), allowing backup tasks (13') to fully execute as long as their duration exceeds backup window (2) end point $T_{end}$ by only a small amount. Preferably, several grace periods (61)-(64) are defined, with all of the grace periods starting at the backup window (2) end point $T_{end}$. This permits assigning grace periods of different length to different backup tasks, e.g. depending on the priority of the backup task. Class-1 backup tasks, being mission critical, will be granted a comparatively long grace period (61). Class-2 and Class-3 backup tasks, being less important, have to terminate within shorter grace periods (62) and (63) in order not to be cancelled. Class-4 backup tasks, being the least important ones, are given the shortest grace period (64). Depending on the expected end time and the priority class of a given backup task, the backup controlling process (106) determines whether the backup task will terminate within the corresponding grace period, in which case the backup task will continue executing, or whether it will exceed the grace period, in which case it will be cancelled.

Figure 3G:
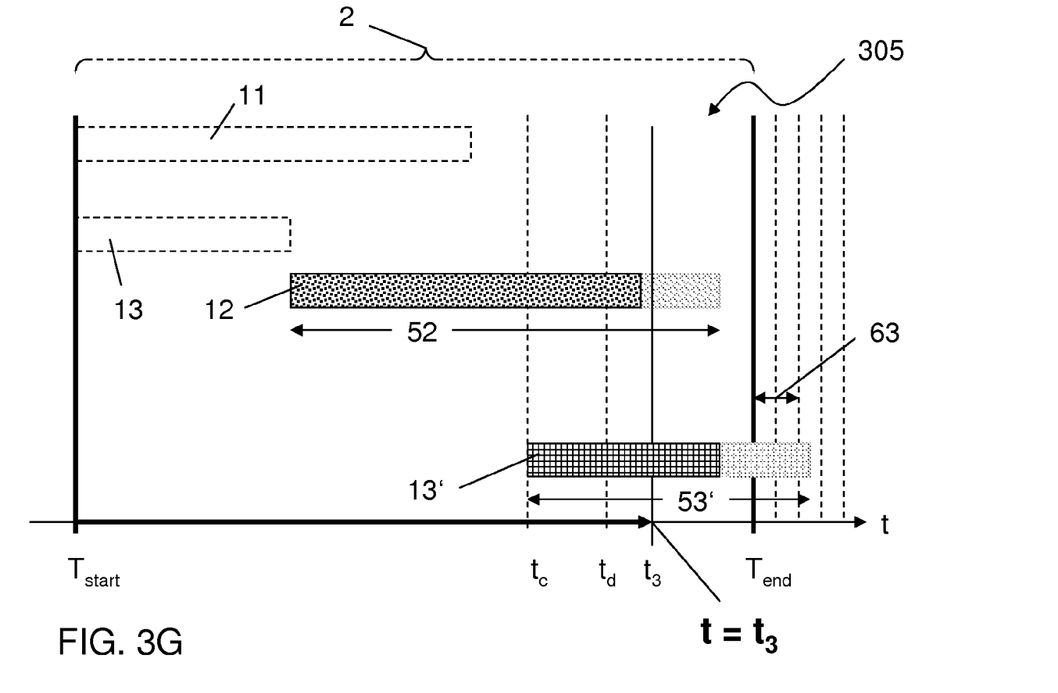
FIG. 3G is a diagram showing the prospective duration of the backup tasks of FIG. 3F at a later time $t_3 > t_2$.

FIG. 3G shows a backup schedule (305) derived from the backup schedule (304) of FIG. 3F, calculated at an even later time $t_3>t_2$, at which time $t_3$ backup tasks (13) and (11) have finished while backup tasks (12) and (13') are still executing. The prospective duration (52) of Class-2 backup task (12), as calculated at time $t_3$, lies within backup window (2). On the other hand, the prospective duration (53') of Class-3 backup task (13'), as calculated at time $t_3$, still exceeds the end point $T_{end}$ of the backup window (2). Moreover, it is expected to exceed the grace period (63) granted to backup tasks of Class-3 priority. Thus, since backup task (13') is not expected to finish within its grace period (63), it will be cancelled at time $t_3$.

Figure 3H:
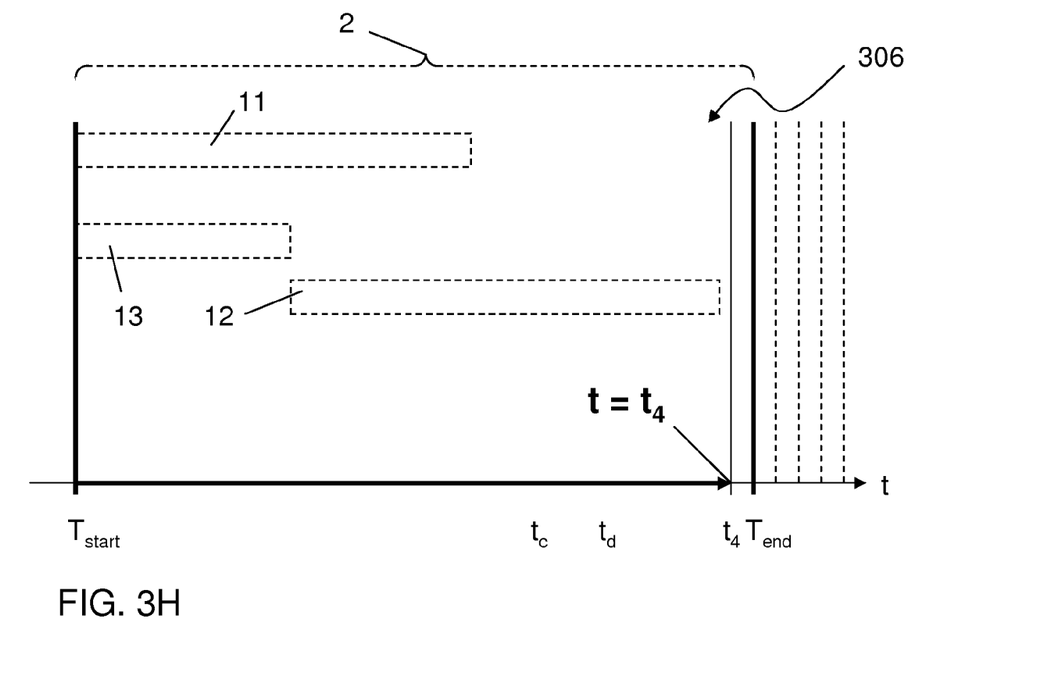
FIG. 3H is a diagram showing the prospective duration of the backup tasks of FIG. 3G at a time $t_4 > t_3$, shortly before termination of the backup window.

FIG. 3H shows a backup schedule (306) derived from the backup schedule (305) of FIG. 3G, calculated at an even later time $t_4>t_3$ close to the end $T_{end}$ of the backup window (2). At this point in time, backup tasks (11), (12) and (13) are seen to have been accomplished. Backup tasks (13') and (14) were cancelled during backup execution. Backup task (14), belonging to a low priority class, was cancelled in order to focus backup resources on higher priority backup tasks which were at a risk to exceed the backup window (2). Backup task (13') was cancelled because it did not finish within the backup window (2) extended by grace period (63). As backup window (2) end time $T_{end}$ is reached, a status report will be issued informing the user that while backup tasks (11), (12) and (13) were accomplished successfully, backup tasks (13') and (14) were cancelled. The user may then manually activate backup tasks (13') and/or (14) or wait for the next backup procedure. Feedback (110) into the backup scheduling step (104) may lead to a reassessment of backup duration predictions (21)-(24) based on the actual backup durations experienced during backup processing, to a reshuffling of the sequence of backup tasks etc. Moreover, feedback (108) into the backup definition step (102) may indicate to the user that backup window (2) and/or grace periods (61)-(64) should be modified to ensure execution of a full backup procedure comprising backup tasks (11)-(14).

A detailed method flow diagram (200) of one embodiment of the backup controlling process as illustrated in FIG. 3D-3H is shown in FIG. 2. After input of the results of backup scheduling process (104) as well as other data (backup priorities, grace periods etc.), necessary for performing backup procedure (1) (202), backup controlling process begins execution as the backup procedure (1) is started, i.e. once starting time $T_{start}$ of backup window (2) has been reached (204). During backup processing prospective durations of the backup processes (11)-(14) of backup procedure are calculated periodically (206). Progress of all backup tasks is periodically stored in a performance repository, e.g. database. If one or more backup processes (12), (13') are expected to exceed a predefined time limit, such as the end time $T_{end}$ of backup window (2), potentially extended by a grace period (step 208), backup procedure (1) is scanned for low priority backup tasks (14) yet to execute. If such tasks (14) are found, they are cancelled in order to focus backup resources on higher priority backup tasks (11), (12), (13') (210), and the prospective durations of the remaining backup processes (11)-(13') are calculated again (206). Thus, in case mission critical backup tasks (11) are expected to miss their target end time, backup control (106) scans backup procedure (1) for lower priority backup tasks (14) and stops them in order to free up resources to improve the performance of the mission critical backups (11). This iterative loop is continued periodically (212) until the end time $T_{end}$ of the backup window (2) has been reached (214). If all backup tasks have finished by $T_{end}$ (216), backup control process (106) is terminated (218)

and status information on the performance of the backup procedure (1) is sent to the user and/or backup scheduling process (104). If some backup tasks are still active by $T_{end}$ (216), backup processing will continue until they exceed their perspective grace periods (268), by which time they will be cancelled (270) and backup control process (106) will be terminated (step 218) with the appropriate status information.

Figure 4:
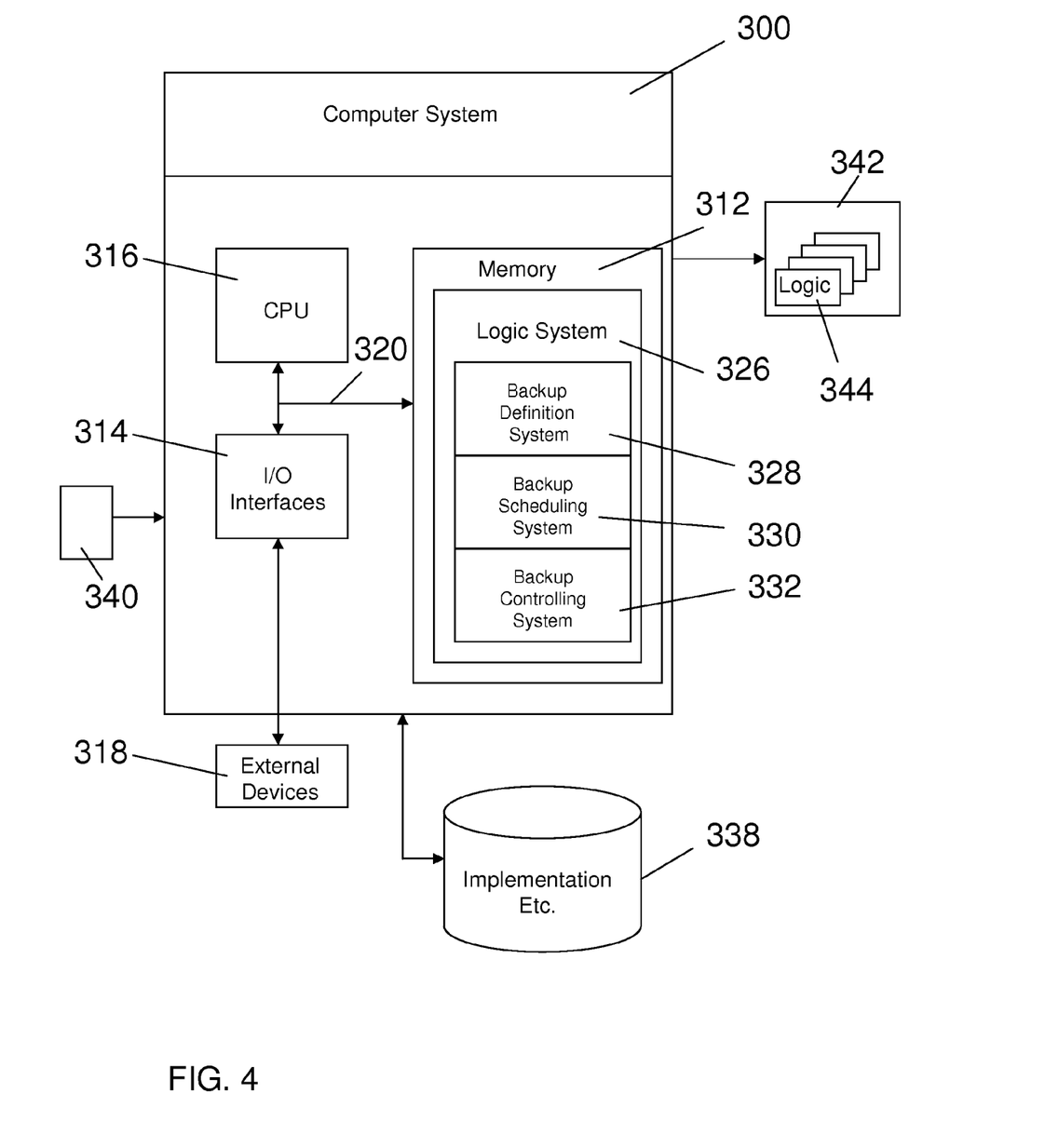
FIG. 4 is a computer system implementation of the invention.

Referring now to FIG. 4, a computer system (300) implementation of one embodiment of the present invention is shown. Specifically, the present invention can be implemented as a computer system (300) and/or program product for managing data backup and performing backup procedures (1). This allows user (340) to define and schedule backup procedures (1) comprising multiple backup tasks (11)-(14) and controls the backup procedures (1) during execution. The data on which backup procedure (1) is to be performed may reside in computer system (300) or else in a different computing system accessed or controlled by computing system (300) via I/O interface (314).

As depicted, computer system (300) generally comprises memory (312), input/output (I/O) interfaces (314), a central processing unit (CPU) (316), external devices/resources (318), bus (320) and data base (338). Memory (312) may comprise any known type of data storage and/or transmission media, including magnetic media, optical media, random access memory (RAM), read-only memory (ROM), a data cache, and a data object etc. Moreover, memory (312) may reside at a single physical location, comprising one or more types of data storage, or can be distributed across a plurality of physical systems in various forms. CPU (316) may likewise comprise a single processing unit, or be distributed across one or more processing units in one or more locations, e.g. on a client and server. I/O interfaces (314) may comprise any system for exchanging information from an external source. External devices (318) may comprise any known type of external device, including keyboard, mouse, voice recognition system, printer, monitor, facsimile etc. Bus (320) provides a communication link between each of the components in the computer system (300) and likewise may comprise any known type of transmission link, including electrical, optical, wireless etc. In addition, although not shown, additional components such as cache memory, communication systems, system software etc. may be incorporated into computer system (300).

Database (338) provides storage for information necessary to carry out the present invention. Such information could include e.g. volume, location and format of backup data, backup resources etc. Database (338) may include one or more storage devices, such as a magnetic disk drive or an optical disk drive. In another embodiment, database (338) includes data distributed across, for example, a local area network (LAN), wide are network (WAN) or a storage area network (SAN). Database (338) may also be configured in such a way that one of ordinary skill in the art may interpret it to include one or more storage devices. Moreover, it should be understood that database (338) could alternatively exist within computer system (300).

Stored in memory (312) is logic system (326). As depicted, logic system (326) generally includes Backup Definition System (328), Backup Scheduling System (330) and Backup Controlling System (332). The systems (328), (330), and (332) shown herein carry out the functions described above.

Backup definition system (328) defines the backup tasks (11)-(14) to be performed as part of backup procedure (1) as well as backup window (2) during which backup procedure (1) will execute. Backup scheduling system (330) classifies the backup processes (11)-(14) into priority classes, and defines grace periods for the priority classes and determines backup schedule (301) such as to fit all backup processes (11)-(14) into backup window (2). Using this information, backup control system (332) will control backup procedure (1) during execution, periodically checking backup task durations and cancelling backup tasks in the case of tasks exceeding temporal thresholds.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, or store the program for use by on in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

Based on a user defined set of backup tasks to be performed during a given backup window, a backup schedule is computed by defining time slots for all backup tasks with backup window and to control progress of the backup tasks as the backup procedure evolves. In one embodiment, historical information of backups processed in the past is used to calculate prospective durations of all backup tasks during scheduling. Similarly, in another embodiment, the backup tasks are prioritized according to their importance. During backup execution, actual backup task progress is periodically monitored. If high priority backup tasks are expected to exceed the predefined time interval, low priority backup tasks are cancelled so that backup resources can be focused on high priority backup tasks.

It will be appreciated that, although specific embodiments of the invention have been described herein, for purposes of illustration various modifications may be made without departing from the spirit and scope of the invention. Accordingly, the scope of protection of this invention is limited only by the following claims and their equivalents.

We claim:

1. A method of managing a backup procedure comprising at least one backup task in a computing system, the method comprising:
    defining a backup window within which at least one backup task is to be executed, including identifying dependencies of the at least one backup task with a second backup task based upon a resource availability in the computing system;
    scheduling the at least one backup task within the backup window accounting for the identified dependencies with the second backup task;
    controlling the progress of the backup task during execution, including periodically updating a backup schedule based upon the resource availability and recalculating time duration for each backup task based upon changes made in data since a previous backup; and cancelling a lower priority backup task to free resources for higher priority backup tasks when the backup is expected to continue beyond a predetermined point in time.

2. The method according to claim 1, wherein the step of scheduling the backup task within the backup window comprises: determining a prospective duration of the backup task; and determining a final startup time of the backup task such that the backup task is expected to finish before an end time of the backup window.

3. The method according to claim 2, further comprising evaluating the prospective duration of backup task based on historical information about at least one past backup task.

4. The method according to claim 1, further comprising classifying the backup task according to its priority during the scheduling step, and defining a grace period depending on the priority of the backup task.

5. The method according to claim 1, wherein the step of controlling the progress of the backup task during execution includes calculating a prospective duration of the backup task during backup procedure execution; and cancelling the backup task when the backup task is expected to continue beyond a predetermined point in time.

6. The method according to claim 5, further comprising cancelling the backup task when the backup task is expected to terminate beyond a grace period after a window end point for the backup task.

7. A system for managing a backup procedure comprising at least one backup task in a computing system, comprising
a backup definition system to define a backup window within which at least one backup task is to be executed including identifying dependencies of the at least one backup task with a second backup task based upon a resource availability in the computing system;
a backup scheduling system to schedule the at least one backup task within a backup window accounting for the identified dependencies with the second backup task; and
a backup control system to control progress of the backup procedure during execution, including periodically updating a backup schedule based upon the resource availability and recalculating time duration for each backup task based upon changes made in data since a previous backup, and to select a lower priority backup task to free resources for higher priority backup tasks when the backup procedure is expected to continue beyond a predetermined point in time.

8. The system according to claim 7, wherein the backup scheduling system determines a prospective duration of the backup task; and determines a final startup time of the backup task such that the backup task is expected to finish before an end time of the backup window.

9. The system according to claim 8, further comprising the backup scheduling system to evaluate the prospective duration of backup task based on historical information about at least one past backup task.

10. The system according to claim 7, further comprising the backup scheduling system to classify the backup task according to its priority during the scheduling step, and to define a grace period dependent upon the priority of the backup task.

11. The system according to claim 7, wherein the backup control system calculates a prospective duration of the backup task during backup procedure execution; and cancels the backup task when the backup task is expected to continue beyond a predetermined point in time.

12. The system according to claim 11, further comprising the backup control system to cancel the backup task when the backup task is expected to terminate beyond a grace period after a window end point for the backup task.

13. An article comprising:
a computer-readable device including computer program instructions configured to manage a backup procedure comprising at least one backup tasks in a computing system, the instructions when executing perform the steps comprising:
defining a backup window within which the at least one backup task is to be executed, including identifying dependencies of the at least one backup task with a second backup task based upon a resource availability in the computing system;
scheduling the at least one backup task within a backup window accounting for the identified dependencies with the second backup task;
controlling progress of the backup procedure during execution, including periodically updating a backup schedule based upon the resource availability and recalculating time duration for each backup task based upon changes made in data since a previous backup; and
selecting cancellation of a lower priority backup task to free resources for higher priority backup tasks when the backup procedure is expected to continue beyond a predetermined point in time.

14. The article according to claim 13, wherein the instructions to schedule the backup task within the backup window determine a prospective duration of the backup task; and determine a final startup time of the backup task such that the backup task is expected to finish before an end time of the backup window.

15. The article according to claim 14, further comprising instructions to evaluate the prospective duration of the backup task based on historical information about at least one past backup task.

16. The article according to claim 13, further comprising instructions to classify the backup task according to its priority during the scheduling, and to define a grace period depending to the priority of the backup task.

17. The article according to claim 13, wherein the instructions to control progress of the backup task during execution includes calculation of a prospective duration of the backup task during backup procedure execution; and cancellation of the backup task when the backup task is expected to continue beyond a predetermined point in time.

18. The article according to claim 17, further comprising instructions to cancel the backup task when the backup task is expected to terminate beyond a grace period after a window end point for the backup task.

* * * * *